United States Patent [19]

Wiencek et al.

[11] Patent Number: 4,963,317

[45] Date of Patent: Oct. 16, 1990

[54] HIGH LOADING URANIUM FUEL PLATE

[75] Inventors: Thomas C. Wiencek, Bolingbrook; Robert F. Domagala, Indian Head Park; Henry R. Thresh, Palos Heights, all of Ill.

[73] Assignee: The United States of America as represented by the United States Department of Energy, Washington, D.C.

[21] Appl. No.: 406,950

[22] Filed: Sep. 13, 1989

[51] Int. Cl.⁵ .................................. G21C 3/00
[52] U.S. Cl. .................... 376/422; 376/426; 376/429; 376/432; 264/0.5
[58] Field of Search ............. 376/432, 426, 429, 422; 264/0.5

[56] References Cited

U.S. PATENT DOCUMENTS

| | | | |
|---|---|---|---|
| H259 | 4/1987 | Tam et al. | 376/146 |
| 2,914,454 | 11/1959 | Gurinsky et al. | 376/432 |
| 2,950,188 | 8/1960 | Picklesimer et al. | 376/422 |
| 2,986,504 | 5/1961 | Goslee et al. | 204/154.2 |
| 3,093,566 | 6/1963 | Currier et al. | 376/432 |
| 3,197,382 | 7/1965 | Zambrow | 376/432 |
| 3,288,571 | 11/1966 | Werner et al. | 23/347 |
| 3,436,307 | 4/1969 | Johnson et al. | 376/432 |
| 3,454,396 | 7/1969 | Johnson et al. | 75/208 |
| 3,564,704 | 2/1971 | Faraday | 29/527.7 |
| 4,038,135 | 7/1977 | Bergougnoux et al. | 176/68 |
| 4,172,807 | 10/1979 | Larker | 252/301.1 |
| 4,209,420 | 6/1980 | Larker | 252/301.1 |
| 4,224,106 | 9/1980 | Delafosse | 176/75 |
| 4,426,338 | 1/1984 | Hackstein et al. | 264/0.5 |
| 4,436,677 | 3/1984 | Radford et al. | 264/0.5 |
| 4,491,540 | 1/1985 | Larker et al. | 252/628 |
| 4,642,204 | 2/1987 | Burström et al. | 252/633 |
| 4,720,370 | 1/1988 | Travelli | 376/422 |
| 4,732,622 | 3/1988 | Preston | 148/11.5 P |
| 4,762,558 | 8/1988 | German et al. | 75/246 |

OTHER PUBLICATIONS

"Silicon-Modified Uranium-Aluminum Alloys for Foreign Reactor Applications", American Institute of Mining, Metallurgical & Petroleum Engineers, Institute of Metals Division, Special Report Series, 1958, pp. 57–62.

Primary Examiner—Stephen J. Lecheri, Jr.
Assistant Examiner—Leon Nigohosian
Attorney, Agent, or Firm—Hugh W. Glenn; Robert J. Fisher; William R. Moser

[57] ABSTRACT

Two embodiments of a high uranium fuel plate are disclosed which contain a meat comprising structured uranium compound confined between a pair of diffusion bonded ductile metal cladding plates uniformly covering the meat, the meat having a uniform high fuel loading comprising a content of uranium compound greater than about 45 Vol. % at a porosity not greater than about 10 Vol. %. In a first embodiment, the meat is a plurality of parallel wires of uranium compound. In a second embodiment, the meat is a dispersion compact containing uranium compound. The fuel plates are fabricated by a hot isostatic pressing process.

38 Claims, 2 Drawing Sheets

HIGH LOADING URANIUM FUEL PLATE

CONTRACTUAL ORIGIN OF THE INVENTION

The United States government has rights in this invention pursuant to contract No. W-31-109-ENG-38 between the U.S. Department of Energy and The University of Chicago representing Argone National Laboratory.

BACKGROUND OF THE INVENTION

The present invention relates to nuclear fuel-containing plate structures for use in nuclear fission reactors. In particular, the present invention relates to high loading uranium fuel plates and to their method of fabrication.

In certain known types of nuclear fission reactors, particularly research reactors, it is known to employ nuclear fuel-containing plate structures to provide the fissionable nuclear fuel, such as uranium or uranium compounds, enriched with uranium 235. In such known plate structures, a fissionable fuel material or "meat" is sandwiched between aluminum cladding plates which afford structural support and containment for the fission products.

In some cases, a uranium aluminum alloy has been used for the meat. This material has excellent behavior under neutron irradiation, in that the material does not swell excessively or otherwise cause trouble, but this material is limited to a low uranium density of approximately 1.3 grams of uranium per cubic centimeter. Because of the low uranium density, it has generally been necessary to use uranium having a high percentage of enrichment with uranium 235. The high enrichment percentage has a disadvantage in that the uranium can readily be reprocessed for use in nuclear weapons.

More recently, dispersion fuels have been used to obtain higher uranium densities in the meat. To produce such dispersion fuels, fine powders of pure aluminum and uranium compounds have been mixed (dispersed) together and pressed into a polyhedron having six substantially rectangular faces to form a dispersion compact for use as the meat. The uranium densities this achieved depend upon the choice of the uranium compound and on its volumetric fraction in the fuel meat. The largest uranium density achieved in commercially produced dispersion compacts has been about 4.8 grams of uranium per cubic centimeter ($gU/cm^3$).

The loading limits of current conventional fabrication techniques have been reached for $U_3Si$ and $U_3Si_2$ powder metallurgy fuel plates. On a laboratory scale, fuel loadings of up to 7.0 $gU/cm^3$ have been successfully produced. There are a smaller number of reactors, however, that require higher fuel loadings. As a point of reference for reactors loaded with HEU enriched $UAl_x$ to 1.7 $gU/cm^3$ (high enrichment uranium at 93% uranium 235) and a conventional fuel meat thickness of 0.020 inches (0.51 mm), the equivalent loading for LEU (low enrichment uranium at 20% uranium 235) would be:

$$\text{Equivalent Loading} = \left[\begin{array}{c}\text{Ratio of} \\ \text{Enrichment}\end{array}\right] \times \left[\begin{array}{c}\text{Original} \\ \text{Loading}\end{array}\right] \times$$

$$\left[\begin{array}{c}\text{Reactivity} \\ \text{Factor}\end{array}\right] = [93/20] \times [1.7] \times [1.15] = 9.1 \; gU/cm^3$$

From a quality and a fabrication point of view, this level of uranium loading is well beyond the loading range possible for conventionally produced powder metallurgy core fuel plates having a meat thickness of 0.020 inch, regardless of the fuel alloy chosen.

The most common problem with highly loaded fuel plates is the limitation of the material system to uniformly respond to the conventional rolling process. The major cause of this is the difference in the hardness of the fuel in the matrix. (The matrix is defined as the aluminum powder intermingled with the uranium powder plus the aluminum alloy of the cladding so that the matrix, in effect, is all metal which surrounds the uranium compound.) The fuel particles are very hard and resist deformation, whereas the matrix is comparatively soft and flows very easily. As the volume fraction of the harder fuel phase in the meat is increased, the classic "dog-bone" effect is seen at about 40 to 50 volume percent. This is a thickening of the ends of the fuel zone such that when viewed in longitudinal cross-section, the fuel zone profile resembles a dog-bone.

The ends of the fuel zone are where the most non-equilibrium conditions occur. In this region, the aluminum cladding is forced over the fuel zone without reducing the meat thickness and a dog-bone occurs. In the center of the fuel zone, the constraint on the meat is about equal during the rolling process, and the deformation is uniform. At the end of the fuel zone the same conditions exist as at the beginning, and this end also thickens. Shaped (tapered) dispersion compacts can reduce but not eliminate this effect up to about 55 volume percent fuel. At higher fuel percentages, the differences in hardness are so great that a fuel zone is generated throughout the whole meat mass which is a series of thick and thin areas, thus providing a series of dog-bones. Because of minimum cladding thickness requirements, as well as uranium uniformity limits, plates with this shape of fuel zone are not acceptable.

The root of this problem is in the conventional rolling process. It is a line contact deformation system. The meat is constrained from lateral motion by the friction between the cladding surface and the line of contact with the rollers. However, the meat can move longitudinally in the rolling direction, since this is the least restrained direction, and dog-boning occurs. This flow is probably greatest during the early rolling passes when the meat is in the least constrained by thickness and geometry. At later passes, there is more resistance and probably less dog-boning.

Because of the dog-boning problem, and the accompanying problems of non-uniform and insufficient cladding thickness, non-uniform fuel loading, and fuel out-of-zone, the conventional rolling process places constraints upon the structure of the prior art uranium fuel plates. For example, for a conventional fuel plate having a thickness of 0.050 inch, the cladding above and below the meat must be 0.015 inch in order to allow for thickness irregularities caused by the conventional rolling process. This means that the meat must have a thickness not greater than 0.020 inch. It is this thickness limit which has caused the present uranium loading limit. Thus, conventional fuel plates having a thickness of 0.050 inch contain a dispersioin compact (meat) having a thickness not greater than 0.020 inch wherein the uranium fuel volume is not greater than about 45 Vol.%, the porosity is about 10 Vol.%, and the aluminum volume in the meat is the balance.

With this then being the state of the art, it an object of the present invention to provide new and improved nuclear fuel-containing plate structures having increased uranium loading.

It is another object of the present invention to provide new and improved nuclear fuel-containing plate structures having increased meat density and reduced porosity.

It is a further object of the present invention to provide such plate structures which have improved structural integrity and uniformity with effective containment of the nuclear fission products.

These and other objects of the present invention, as well as the advantages thereof, will become more clear from the description which follows.

SUMMARY OF THE INVENTION

The objects of the present invention are achieved by producing a high loading uranium fuel plate by hot isostatic pressing, hereinafter referred to as the "HIP" process. Over the past fifteen years, equipment for the HIP process has become more readily available, and the HIP process has gone from being a specialized laboratory technique to a commercially used process for specific applications.

In practicing the HIP process for fabricating the high loading uranium fuel plates of this invention, the fuel plate workpiece is hermetically sealed, placed in a pressure chamber, subjected to a high pressure environment, and heated to an appropriate temperature below the melting temperature of the aluminum alloy cladding plates for a time sufficient to densify, sinter and diffusion bond the fuel plate.

Diffusion bonding is the phenomenon whereby atoms of the aluminum alloy of the cladding plates diffuse across the interface between the plates under high pressure and at an elevated temperature which is below the melting temperature of the aluminum alloy. The actual specification which is used to test for proper diffusion bonding for acceptable aluminum clad fuel plates under the prior art rolling process is a requirement that there be a minimum of 50% grain growth of aluminum alloy grains across the interface between the two aluminum alloy cladding plates.

The conventional HIP process may be operated at temperatures up to 2000° C. (3632° F.). Isostatic pressures of up to 300 MPa (45,000 psig) are typical. The time is typically from 1 to 4 hours, although the time interval may be greater as may be desired for the particular purpose of the operation.

The conditions under which the fuel plates of this invention can be fabricated are less severe since the fuel plate contains a meat of structured uranium compound which is confined between two aluminum alloy cladding plates. Temperatures are about 500° C. and the isostatic pressure is about 12,000 psig. A time of four hours is utilized, although a longer time may be used when a fuel plate having a low porosity is desired.

Using the HIP process in accordance with the present invention to produce the standard fuel plate having a thickness of 0.050 inch results in a plate having a meat thickness of 0.030 inch as compared to the meat thickness of prior art fuel plates which are only 0.020 inch thick. Additionally, the conventional rolling process results in a fuel plate having a content of uranium compound of about 45 Vol.% maximum, with a porosity of about 10 Vol.%, whereas the fuel plate of the present invention has a content of uranium compound which is greater than 45 Vol.%, and the porosity can be produced at a conventional 10 Vol.% or at any lower porosity as may be desired. Whereas the standard fuel plates have a maximum fuel loading of about 7 gU/cm$^3$, the fuel plates of this invention have a fuel loading greater than 7 gU/cm$^3$ and loadings as high as about 9 gU/cm$^3$ may be produced.

Thus, numerous advantages are derived by the practice of this invention. Uranium fuel plates are produced which have a high fuel loading. The inventive fuel plates have a uniform cladding thickness and a uniform fuel zone thickness since the fuel plates are produced in a uniform high pressure environment under hot isostatic pressing. In addition, reduced instances of fuel out-of-zone are experienced. The process of the present invention also may be operated as a batch process, whereby a number of fuel plates are produced in a single batch. In contrast, under the rolling process only a single fuel plate is produced per operation. The HIP process allows for the control of atmosphere, temperature pressure, and time in order to produce the specific result desired for a given fuel plate. For example, fuel plates can be produced with low or substantially no porosity. In addition, fuel plates may be produced which contain shaped or contoured fuel loadings.

Two types of high loading uranium fuel plates have been fabricated in accordance with the present invention. The first type of fuel plate comprises an aluminum cladding containing a meat consisting of a plurality of parallel wires of a uranium compound where the wires have a diameter of up to 0.030 inch. The second embodiment of the high loading uranium fuel plate is a fuel plate containing a meat consisting of a dispersion compact containing uranium compound plus pure aluminum having a thickness greater than 0.020 inch and up to 0.030 inch.

Thus, in its method aspects the present invention comprehends a method of producing a high loading uranium fuel plate which comprises enclosing a meat containing structured uranium compound between a pair of ductile metal cladding plates in face-to-face relationship and subjecting the resulting assembly to hot isostatic pressing under conditions sufficient to diffusion bond the cladding plates and provide a resulting fuel plate having a uniform cladding and a uniform high fuel loading.

In its article aspects, the present invention comprehends a high loading uranium fuel plate which contains a meat comprising structured uranium compound confined between a pair of diffusion-bonded ductile metal cladding plates uniformly covering the meat, the meat having a uniform high fuel loading including a content of uranium compound greater than about 45 Vol.% at a porosity not greater than about 10 Vol.%.

A clearer understanding of the present invention will be obtained from the disclosure which follows when read in light of the accompanying drawings.

DESCRIPTION OF THE PREFERRED EMBODIMENTS

Figure 1:
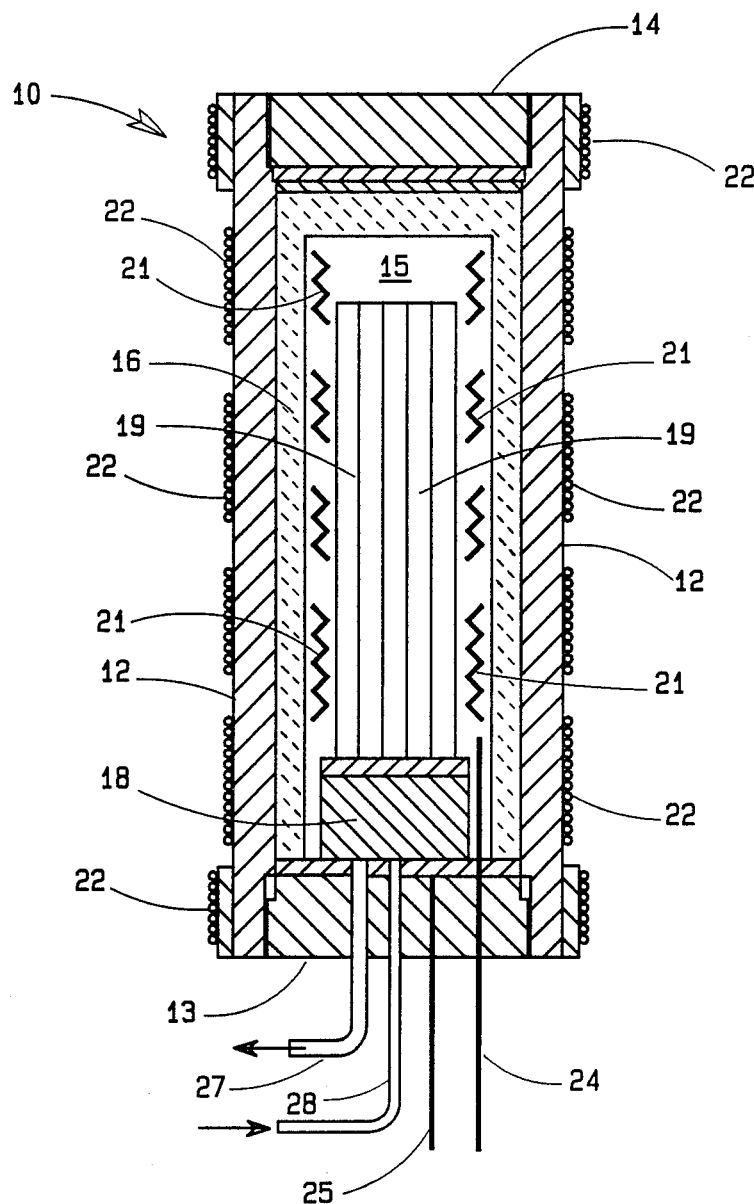
FIG. 1 is a simplified schematic representation of an apparatus for hot isostatic pressing of a plurality of uranium fuel plates in accordance with the present invention.

FIG. 1 illustrates a typical apparatus 10 for hot isostatic pressing of a plurality of fuel plates in accordance with the present invention. The apparatus 10 includes a cylindrical pressure vessel 12, a base member 13, and a top cover 14, which define a pressure chamber 15. The interior of the chamber is thermally shielded by an internal heat shield 16 of an insulating material which may be a suitable ceramic. Also within the chamber is a workpiece pedestral 18 upon which a plurality of workpieces 19 is shown, each workpiece consisting of meat between two aluminum alloy cladding plates. The chamber additionally contains one or more heating elements 21 which are shown as electrical heaters. The outside surface of the apparatus has a plurality of cooling coils 22 which alternatively may consist of one or more cooling jackets.

A well containing a thermocouple 24 or any similar temperature sensing device passes up through the base member 13 and into the open space of the chamber 15. Conductor 25, also passing through the base member 13, provides an electrical power supply for the heating elements 21. The base member is also penetrated by a conduit 27 which is an evacuation line running to a vacuum pump or to an equivalent evacuation device, not shown. A conduit line 28 also passes up through the base member 13 as a feed line for an inert gas, such as argon.

In the operation of the HIP process in accordance with the present invention, the fuel plates 19 are loaded into the chamber 15 through the top and mounted upon the pedestral 18. The top 14 is then secured over the chamber 15 to enclose the fuel plates. Air is then pumped out of the chamber via line 27 by means of the vacuum pump. When the vacuum pump has produced a substantial vacuum within the chamber, the vacuum pump is shut off. Argon is then introduced into the chamber via line 28 at an elevated pressure. The vacuum pump then removes pressurized argon from the chamber in order to produce another vacuum, and it is again shut off. Argon is introduced into the chamber a second time via line 28 and the chamber is then evacuated for a third time. The alternative evacuation and pressurization of the chamber is undertaken for a number of cycles sufficient to provide that substantially no oxygen will be contained in the chamber. This elimination of oxygen is undertaken in order to provide that the electrical heaters 21 will not have a shortened life due to oxidation. At this point, the vacuum line 27 is closed off by valving, not shown, the temperature is raised to about 500° C., and the chamber is pressured up to about 12,000 psig with argon. The fuel plates are allowed to sit under this high isostatic pressure at this temperature for about four hours.

Figure 2:
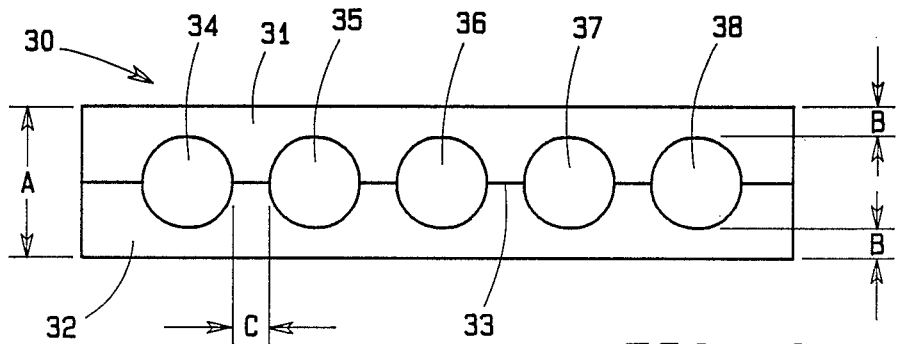
FIG. 2 is a simplified schematic representation for the cross-section of a fuel plate in accordance with the present invention wherein the meat consists of a plurality of wires of uranium compound in a spaced parallel orientation.

FIG. 2 shows a schematic representation of the cross-section of a first embodiment of a high loading uranium fuel plate in accordance with this invention. The fuel plate 30 has an upper aluminum alloy cladding plate 31 and a lower aluminum alloy cladding plate 32 which are in face-to-face relationship to provide a cladding plate interface 33. The fuel plate contains a meat consisting of a structured uranium compound which is in the form of a plurality of wires in a substantially longitudinal parallel configuration. Five wires 34–38 are shown in FIG. 2 for purposes of illustration. Generally, the uranium compound will be $U_{75}Ga_{10}Si_{15}$, although any other uranium compound may be used which has ductility sufficient to allow it to be fabricated into a wire. Although circular wires are shown, they may be square or rectangular in cross-section if desired.

In order to fabricate the high loading uranium fuel plate of FIG. 2, aluminum alloy cladding plates 31 and 32 have a series of recesses in the shape of circular grooves in their inner surface which will contain the plurality of uranium compound wires. The wires are inserted into the circular grooves of the lower cladding plate 32, and the upper cladding plate 31 is then laid down upon the wires and the lower cladding plate. The assembly is then welded on the surface to seal the periphery of the cladding plate interface, or it is enclosed in a deformable can. When the fuel plate is then subjected to hot isostatic pressing, any space of the grooves around the uranium compound wires is substantially eliminated due to the high pressure of about 12,000 psig. In addition, the interface 33 between the upper cladding plate 31 and the lower cladding plate 32 becomes diffusion bonded. The diffusion bonding is shown by the fact that a cross-section of the fuel plate will show, by means of a photomicrograph, that there is crystal growth across the interface 33 from one cladding plate to the other. In general, the crystal growth will be at a minimum of 50% in order to meet the specification for conventional rolled fuel plates.

The resulting high loading uranium fuel plate has the conventional thickness of 0.050 inch as shown by the dimension A. In addition, the thickness of the cladding over the meat is 0.010 inch as shown by the dimension B. The uranium meat of the fuel plate has a thickness of 0.030 inch since the meat consists of the plurality of wires which have a diameter of 0.030 inch. The separation between the wires is 0.010 inch as shown by the dimension C.

Figure 3:
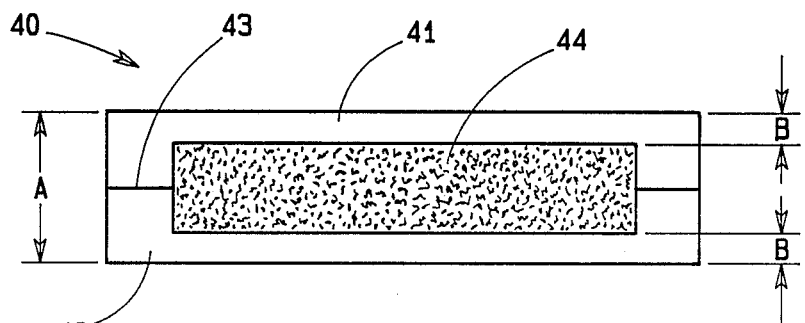
FIG. 3 is a simplified schematic representation of a high loading uranium fuel plate in accordance with the present invention wherein the meat consists of a dispersion compact.
Figure 4:
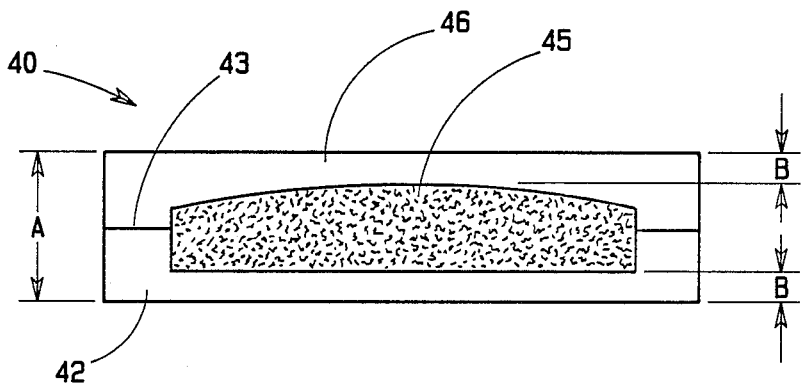
FIG. 4 is a simplified schematic representation of a high loading uranium fuel plate in accordance with the present invention wherein the meat consists of a shaped or contoured dispersion compact.

FIG. 3 illustrates a schematic representation of the cross-section of a second embodiment of a high loading fuel plate in accordance with the present invention. The fuel plate 40 has an upper cladding plate 41 of an aluminum alloy and a lower cladding plate 42 of the same aluminum alloy. A cladding plate interface 43 is found between the two cladding plates, and the fuel plate contains a meat 44 which consists of a dispersion compact. Typically, the dispersion compact has the configuration of a polyhedron having six substantially rectangular faces. Alternatively, the dispersion compact may be shaped or contoured in accordance with the needs of certain reactors. FIG. 4 illustrates one typical shaped or contoured dispersion compact 45 in a fuel plate according to the present inventin wherein the upper cladding plate 46 is also shaped to fit the contour of the dispersion compact.

When the aluminum cladding plates 41 and 42 are fabricated, they contain an elongated recess having a rectangular cross-section. A "green" dispersion compact consisting of a mixture of uranium compound powder and pure aluminum powder is contained within the recesses of the upper and lower fuel plates. When the fuel plate is subjected to hot isostatic pressing, any voids around and within the dispersion compact are reduced because of the elevated pressure. In addition, the aluminum alloy powder becomes bonded together by diffusion, and diffusion bonding occurs at the interface 43 between the upper and lower cladding plates. The diffusion bonding is shown by photomicrographs of the interface which show substantial crystal growth from one aluminum alloy cladding plate into the order. As previously noted, the crystal growth across the interface will be a minimum of 50% in order to meet the specification for acceptable fuel plates which have been conventionally rolled.

The resulting high loading uranium fuel plate of FIG. 3 and 4 has a conventional thickness of about 0.050 inch as shown by the dimension A. The thickness of the cladding is only 0.010 inch as shown by dimension B. Thus, the thickness of the resulting meat is about 0.030 inch which is 50% greater than the 0.020 inch thick meat which is found in a conventional rolled uranium fuel plate containing such a dispersion compact.

EXAMPLE 1

Wire was fabricated of $U_{75}Ga_{10}Si_{15}$ having a diameter of 0.030 inch. The wire was cut into lengths for hot isostatic pressing within aluminum alloy cladding plates. The structure which was tested is based on that shown in FIG. 2, but with greater spacing between the five wires contained within the cladding plates. Wires 34 and 38 were made of the $U_{75}Ga_{10}Si_{15}$, but the wire 36 was made of a 4043 alloy aluminum and wires 35 and 37 were made of stainless steel. The aluminum and stainless steel wires were included merely by way of comparison. Type 1100 aluminum alloy was used for the cladding plates 31 and 32.

The resulting uranium fuel plate assembly was placed within a hot isostatic pressing apparatus of a laboratory size which only held one fuel plate at a time. A plurality of fuel plates were subjected to hot isostatic pressing within this apparatus, one after the other. The temperature was about 500° C. and the pressure was about 12,000 psig. The fuel plate assemblies were each held under these conditions for a period of about four hours.

The resulting fuel plates were cut transversely and photomicrographs were taken. The photomicrographs showed that the aluminum alloy wire interface had virtually disappeared, thus showing good diffusion bonding between the aluminum alloy wire and the aluminum alloy cladding plates. In addition, the photomicrographs showed that the interface between the two aluminum cladding plates had diffusion bonded. The photomicrographs further showed an intimate tight contact between the aluminum cladding plates and the wires of $U_{75}Ga_{10}Si_{15}$.

The results were substantially the same for all of the uranium fuel plates which were fabricated. Fuel plates prepared as described and with the dimensions given in connection with FIG. 2 above would have a fuel loading of 8.6 $gU/cm^3$.

EXAMPLE 2

A number of fuel plates containing dispersion compacts in accordance with the structure shown in FIG. 3 were fabricated. The diffusion compacts consisted of tungsten powder and pure aluminum powder. It is conventional to use tungsten in place of uranium for experimental work because it has virtually the same physical characteristics, although upon ocassion depleted uranium may be used. The dispersion compacts were placed between aluminum cladding plates which were fabricated of type 1100 aluminum alloy. The resulting fuel plate assemblies were processed individually in the laboratory HIP apparatus by being subjected to hot isostatic pressing at a temperature of about 500° C. and a pressure of about 12,000 psig for a period of about four hours.

After the fuel plates had been pressed, some were cut transversely and photomicrographs of the cut surfaces were taken. The photomicrograhs of the transverse cross-section showed diffusion bonding of the cladding interface. In addition, the pure aluminum powder of the dispersion compact diffusion-bonded to itself and to the cladding plates at the interface between the cladding plates and the dispersion compact. Thus, the tungsten particles were imbedded in a matrix of diffusion-bonded aluminum.

Additionally, immersion density measurements showed that a reduced porosity had occured. The original green dispersion compacts had a porosity of about 15 percent, but the dispersion compacts which had been subjected to hot isostatic pressing had a porosity which ranged from about 4 to 7 percent. The volume of tungsten substitute for uranium was about 50 percent and the balance of the volume for each fuel plate was the total of the aluminum in the plate.

The fuel loading of the fuel plates (the tungsten substituted for uranium) was 5.6 $gU/cm^3$. Since the meat had a thickness of 0.030 inch in comparison to the prior art meat thickness of 0.020 inch, this is an Equivalent Loading of 8.4 $gU/cm^3$. This figure for Equivalent Loading is calculated as follows:

$$\text{Equivalent Loading} = (5.6 \text{ gU/cm}^3) \times (0.030 \text{ in.}/0.020 \text{ in.})$$
$$= 8.4 \text{ gU/cm}^3$$

The cladding surface on all of the fuel plates was very uniform and the meat within the cladding plates was also very uniform.

It can be readily understood from the foregoing disclosure that any suitable uranium comopound may be used in the meat of the inventive fuel plates. In addition, the meat may contain high enrichment uranium or low enrichment uranium, or any level of enrichment in between.

Furthermore, those skilled in the art will readily understand that the porosity of the finished fuel plate will depend upon the conditions under which the fuel plate is processed. The conditins of time, temperature and pressure can be controlled in the HIP process so that the final porosity of a fuel plate containing a dispersion compact may be high or low to the extent desired. For example, although standard fuel plates have a porosity of 10 Vol.%, an increase in time and/or pressure can produce porosities of 5 Vol.% or less.

Accordingly, in light of the foregoing disclosure, further alternative embodiments of the invention high loading uranium fuel plate, as well as its process of fabrication, will undoubtedly suggest themselves to those skilled in the art. It is thus intended that the disclosure be taken as illustrative only, and that it not be construed in any limiting sense. Modifications and variations may be restored to without departing from the spirit and the scope of this invention, and such modifications and variations are considered to be within the purview and the scope of the appended claims.

The embodiments of the invention in which an exclusive property or privilege is claimed are defined as follows:

1. Method of producing a high loading uranium fuel plate which comprises enclosing a meat containing structured uranium compound between a pair of ductile metal cladding plates in face-to-face relationship wherein said metal cladding plates contain separate recesses for enclosing said meat and subjecting the resulting assembly to hot isostatic pressing under conditions sufficient to diffusion bond said cladding plates together to provide a resulting fuel plate having uniform cladding and uniform high fuel loading.

2. Method according to claim 1 wherein said uniform high fuel loading comprises a content of uranium compound in said meat greater than about 45 Vol.% at a porosity not greater than about 10 Vol.%.

3. Method according to claim 2 wherein said porosity is not greater than about 5 Vol.%.

4. Method according to claim 1 wherein said meat comprises structured uranium compound in the form of a plurality of wires.

5. Method according to claim 4 wherein said wires are in substantially parallel configuration.

6. Method according to claim 4 wherein said wires consist essentially of uranium compound.

7. Method according to claim 4 wherein said uniform high fuel loading is greater than about 7 $gU/cm^3$.

8. Method according to claim 7 wherein said uniform high fuel loading is about 9 $gU/cm^3$.

9. Method according to claim 1 wherein said meat comprises structured uranium compound in the form of a dispersion compact.

10. Method according to claim 9 wherein said dispersion compact has the configuration of a polyhedron having six substantially rectangular faces.

11. Method according to claim 9 wherein said dispersion compact is shaped or contoured.

12. Method according to claim 9 wherein said dispersion compact comprises a substantially uniform mixture of powdered uranium compound and powdered ductile metal.

13. Method according to claim 12 wherein said cladding plates comprise aluminum alloy and said powdered ductile metal comprises high purity aluminum.

14. Method according to claim 9 wherein said uniform high fuel loading is an equivalent loading greater than about 7 $gU/cm^3$.

15. Method according to claim 14 wherein said equivalent high fuel loading is about 9 $gU/cm^3$.

16. Method of claim 1 wherein said meat comprises a dispersion compact of uranium compound and ductile metal, and said conditions are further sufficient to control the porosity of said meat.

17. A high loading uranium fuel plate which contains a meat comprising structured uranium compound confined between a pair of diffusion bonded ductile metal cladding plates uniformly covering said meat, said meat having a uniform high fuel loading comprising a content of uranium compound greater than about 45 Vol.% at a porosity not greater than about 10 Vol.%.

18. A high loading uranium fuel plate according to claim 17 wherein said porosity is not greater than about 5 Vol.%.

19. A high loading uranium fuel plate according to claim 17 wherein said meat has a thickness greater than about 0.020 inch.

20. A high loading uranium fuel plate according to claim 19 wherein said meat thickness is not greater than about 0.030 inch.

21. A high loading uranium fuel plate according to claim 17 wherein said meat comprises structured uranium compound in the form of a dispersion compact.

22. A high loading uranium fuel plate according to claim 21 wherein said dispersion compact comprises a substantially uniform mixture of uranium compound and a substantially pure ductile metal.

23. A high loading uranium fuel plate according to claim 22 wherein said cladding plates comprise aluminum alloy and said substantially pure ductile metal in said dispersion compact comprises substantially pure aluminum.

24. A high loading uranium fuel plate according to claim 21 wherein said uniform high fuel loading is a uniform high Equivalent Loading greater than about 7 $gU/cm^3$.

25. A high loading uranium fuel plate according to claim 24 wherein said high Equivalent Loading is about 9 $gU/cm^3$.

26. A high loading uranium fuel plate according to claim 21 wherein said dispersion compact has the configuration of a polyhedron having six substantially rectangular faces.

27. A high loading uranium fuel plate according to claim 21 wherein said dispersion compact is shaped or contoured.

28. A high loading uranium fuel plate according to claim 17 wherein said meat comprises structured uranium compound in the form of a plurality of wires.

29. A high loading uranium fuel plate according to claim 28 wherein said wires are in substantially parallel configuration.

30. A high loading uranium fuel plate according to claim 28 wherein said wires consist essentially of uranium compound.

31. A high loading uranium fuel plate according to claim 28 wherein said fuel plate has a high fuel loading greater than about 7 $gU/cm^3$.

32. A high loading uranium fuel plate according to claim 31 wherein said high fuel loading is about 9 $gU/cm^3$.

33. A high loading uranium fuel plate according to claim 17 wherein said fuel plate has a thickness of about 0.050 in., and said meat has a thickness greater than about 0.020 in. and not greater than about 0.030 in.

34. A high loading uranium fuel plate according to claim 33 wherein said meat comprises structured uranium compound in the form of a plurality of wires.

35. A high loading uranium fuel plate according to claim 34 wherein said wires consist essentially of uranium compound.

36. A high loading uranium fuel plate according to claim 33 wherein said meat comprises structured uranium compound in the form of a dispersion compact.

37. A high loading uranium fuel plate according to claim 36 wherein said dispersion compact comprises a substantially uniform mixture of uranium compound and a substantially pure ductile metal.

38. A high loading uranium fuel plate according to claim 37 wherei said cladding plates comprise aluminum alloy and said substantially pure ductile metal in said dispersion compact comprises substantially pure aluminum.

* * * * *